July 28, 1959            T. E. ALLEN            2,896,361
RAT TRAPS
Filed June 10, 1957
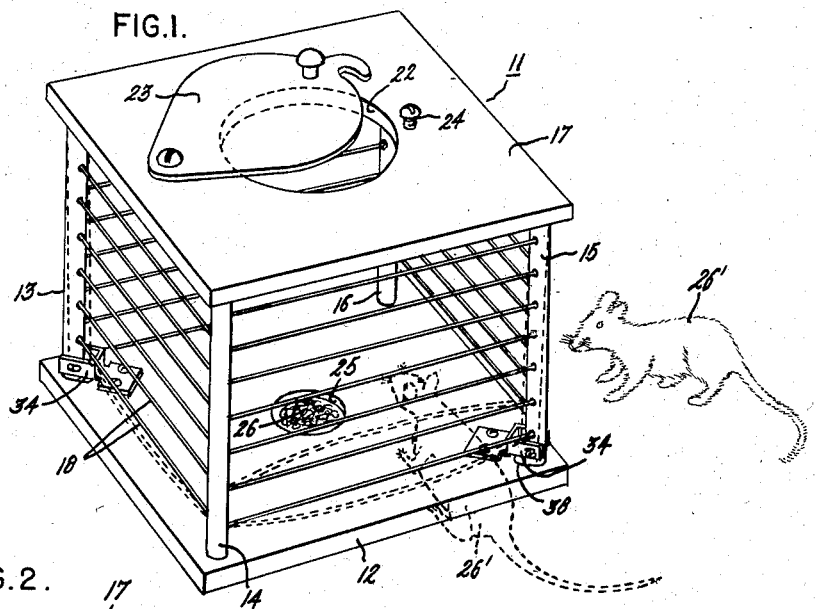
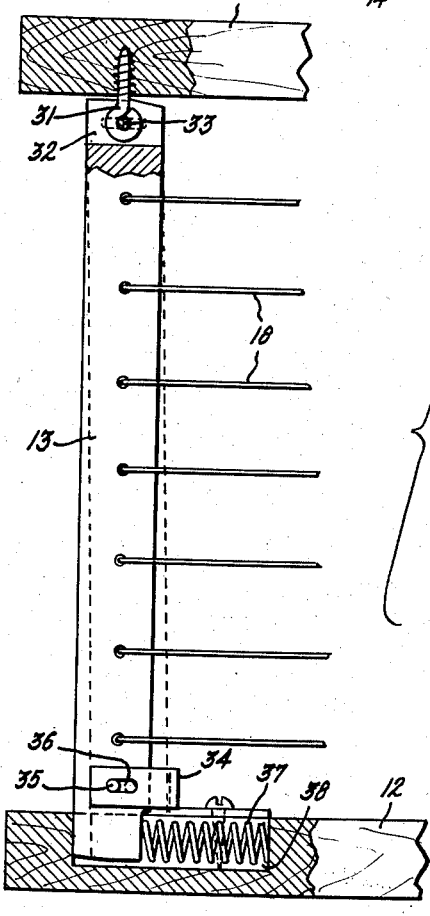
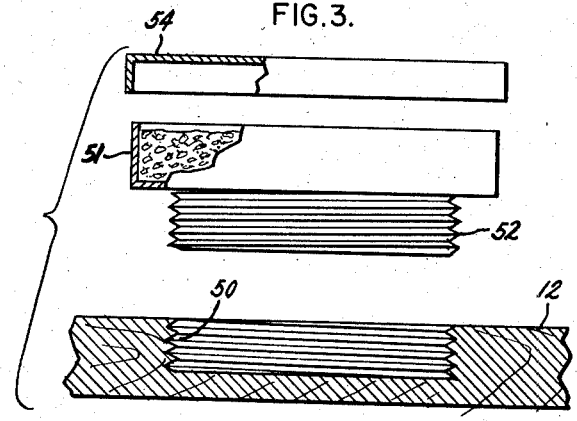
INVENTOR:
THOMAS E. ALLEN,
BY    *F. Alan Langley*
HIS ATTORNEY.

United States Patent Office 2,896,361
Patented July 28, 1959

2,896,361

RAT TRAPS

Thomas E. Allen, Syracuse, N.Y.

Application June 10, 1957, Serial No. 664,678

9 Claims. (Cl. 43—131)

The present invention relates to a device for trapping rodents, and more particularly, to improvements in such devices having additional safety features.

A primary consideration in rodent traps of all types is providing means for trapping the undesirable rodents, while preventing household pets and children from hurting or maiming themselves. In recent years many traps have been provided, however, they have seriously lacked in protective features.

Accordingly, a principal object of the present invention is to provide an improved rat trap wherein a rodent is provided with means to destroy himself, there being however means to prevent harm to other animals or persons.

A further object of the present invention is to provide means for enabling rodents of various sizes to enter and exit the confines of the trap.

The features of this invention which are believed to be novel are set forth with particularity in the appended claims. The invention itself, however, both as to its organization and advantages thereof may best be understood by reference to the following description when read in connection with the accompanying drawings herein:

Fig. 1 is a perspective view of a device embodying the principles of the present invention;

Fig. 2 is a view of one corner of the trap, parts being broken away and shown in section;

Fig. 3 is an exploded view of another embodiment of the present invention with parts broken away and shown in section.

In the drawings, a now preferred embodiment of the present invention is therein designated by the general reference numeral 11. The improved rat trap 11, comprises a base plate 12 having mounted thereon four corner posts 13, 14, 15 and 16. Attached to the four corner posts 13–16 inc., is a cover plate 17. Wires designated as 18 pass through bores in the four corner posts 13–16 or may be attached thereto by staples. Either one or more of the four corner posts 13–16 inc., are resiliently mounted on the base plate 12, as will be described hereafter. The cover plate 17 contains a circular aperture 22 which has mounted thereover a removable plate 23. The base plate 12 contains therein a dish-shaped depression 25.

In operation the plate 23 is removed from atop aperture 22 and rodent destroying means such as poisoned food designated at 26 is placed in the depression 25. When a rat, indicated generally at 26' discovers the destroying means 26, he enters between the wires 18. If the rat is exceptionally large, he is still able to enter the trap because the resilient-mounted corner posts give and the wires will separate as will be hereinafter described, thereby enabling the rat to enter the trap.

It can be easily seen that this trap will prevent children and domestic animals from reaching the rodent destroying means 26, since means 25 is completely surrounded by the base plate 12, the cover 17 and the wires 18.

As mentioned above, one or all of the corner posts 13–16, inc. are resiliently mounted on the base plate 12.

In a preferred embodiment of the present invention, diagonally opposing posts, as post 13 and post 15 are resiliently mounted on base plate 12. Referring now to Figure 2, the corner post 13 is therein shown mounted on base plate 12 and supporting cover plate 17 thereon. Cover plate 17 is movably attached to the top of post 13 by a screw eye 31 which is attached to cover plate 17 and fits into a groove 32 in post 13. The screw eye 31 has extending therethrough a pin 33, which is removably mounted in the post 13.

An end of the post 13 is resiliently mounted on the base plate 12. A U-shaped yoke 34 is mounted on base plate 12 in cooperation with post 13. A pin 35 extends through an elongated aperture 36 in yoke 34 and is mounted in post 13. A spring 37 is mounted in a groove 38 in base plate 12 and normally urges the end of the post 13 outwardly.

In operation, when a rodent pushes on wires 18 the lower end of the post 13 is forced inwardly against the normal urging of the spring 37. The pin 35 slides in the aperture 36 of the yoke 34, thereby enabling the end of the post 13 to move. Since the wires 18 are supported on the post 13, the wires will no longer be taut, but will slacken, thereby enabling the rodent to enter and exit the trap.

Referring now to Figure 3, there is shown therein another embodiment of the present invention. In this embodiment, a threaded aperture 50 is provided in the base plate 12. A rodent destroying means designated as 51 is provided with threads 52 that cooperate with the threads 50 of the base plate 12. A top 54 is provided for the rodent-destroying means. In operation the rodent-destroying means 51, is threaded into the aperture 50 and subsequently the top 54 is removed through the aperture 22 (Fig. 1), thereby enabling fast, efficient and positive attaching of the rodent destroying means 51 on the base plate 12, and further enables the fast removal of the top 54.

I claim:

1. A rodent trap comprising a base plate having corners, four corner posts flexibly mounted on said base plate and extending upwardly therefrom, a cover having an aperture therein and mounted on said corner posts, rodent destroying means mounted in the middle of said base plate, and spaced wires connecting said flexibly mounted corner posts providing variable entrance openings for rodents therebetween but preventing large animals from reaching said rodent destroying means.

2. A rodent trap comprising a base plate having corners, corner posts for said base plate, means for resiliently mounting said corner posts on said base plate so that said corner posts extend upwardly from said base plate, a cover having an aperture therein and mounted on said corner posts, means for covering said aperture, rodent destroying means mounted in the middle of said base plate, and spaced wires connecting said resiliently-mounted corner posts providing variable entrance openings for rodents therebetween but preventing large animals from reaching said rodent destroying means.

3. A rodent trap comprising a base plate having corners, corner posts, means for resiliently mounting at least two of the said corner posts on said base plate, all of said corner posts extending upwardly from said base plate, a cover having an aperture therein mounted on said corner posts, means for covering said aperture, rodent destroying means mounted in the middle of said base plate, and spaced wires connecting said resiliently mounted corner posts providing variable entrance openings for rodents therebetween but preventing large animals from reaching said rodent destroying means.

4. A rodent trap comprising a base plate having corners and a threaded recess therein, corner posts resiliently mounted on said base plate and extending upwardly therefrom, a cover plate mounted on said corner posts and having an aperture therein, said cover-plate aperture being located directly above said base plate aperture, rodent-destroying means encased in a threaded receptacle, said threaded receptacle being detachably-threaded in said threaded aperture, and spaced wires connecting said resiliently mounted corner posts providing variable entrance openings for rodents therebetween but preventing large animals from reaching said rodent destroying means.

5. A rodent trap comprising a base plate having corners and a threaded recess therein, corner posts resiliently mounted on said base plate and extending upwardly therefrom, a cover plate having an aperture therein, said aperture in said cover plate being coaxial with said threaded recess, means for closing said cover plate aperture, a threaded receptacle detachably threaded into said threaded recess, rodent-destroying material mounted within said threaded receptacle, a removable cover mounted on said threaded receptacle so that, after said threaded receptacle is mounted in said threaded aperture, said removable cover may be removed through said cover plate aperture, and spaced wires connecting said corner posts providing variable entrance openings for rodents therebetween but preventing large animals from reaching said rodent-destroying means.

6. A rodent trap comprising a base plate having corners, four corner posts, means for rigidly mounting two of said corner posts on opposite corners of said base plate, said base plate having grooves at the other two corners thereof, the other two of said four corner posts extending into said grooves, means attaching said other two of said corner posts so that the ends thereof are movable substantially in the plane of said base plate, said four corner posts extending upwardly from said base plate, a cover attached to said corner posts, rodent destroying means mounted in the middle of said base plate, and spaced wires connecting said rigidly and movably mounted corner posts providing variable entrance openings for rodents therebetween but in cooperation with said cover and said base plate preventing large animals from reaching said rodent destroying means.

7. A rodent trap comprising a base plate having corners, first and second pairs of corner posts, each of said first pair of corner posts being rigidly mounted at opposite corners of said base plate and extending upwardly therefrom, said base plate having grooves in the opposite corners thereof from said first pair of posts, the lower end of one of said second pair of posts extending into a first one of said grooves, the lower end of the other of said second pair of corner posts extending into the other of said grooves, a spring mounted in each of said grooves normally urging the lower end of each of said second pair of corner posts in an outwardly direction, means for preventing upward motion of each of said second pair of said corner posts, rodent destroying means mounted in the middle of said base plate, a cover, hinged means for rotatably attaching the upper ends of said corner posts to said cover and spaced wires connecting said corner posts so that when a rodent proceeds inwardly through the space between said wires the spring mounted corner posts move inwardly thereby enabling a rodent to get into and out of said trap.

8. A rodent trap comprising a base plate having corners, first and second pairs of corner posts, each of said first pair of corner posts being rigidly mounted at opposite corners of said base plate and extending upwardly therefrom, said base plate having grooves in the opposite corners thereof from said first pair of posts, the lower end of one of said second pair of posts extending into a first one of said grooves, the lower end of the other of said second pair of corner posts extending into the other of said grooves, a spring mounted in each of said grooves normally urging the lower end of each of said second pair of corner posts in an outwardly direction, U-shaped metal yokes mounted on said base plate so that the arms of said U-shaped metal yokes enclose said lower ends of said second pair of corner posts and pins extending through said yokes and the lower ends of said second pair of posts, rodent destroying means mounted in the middle of said base plate, a cover, hinged means for rotatably attaching the upper ends of said corner posts to said cover and spaced wires connecting said corner posts so that when a rodent proceeds inwardly through the space between said wires the spring mounted corner posts move inwardly thereby enabling a rodent to get into and out of said trap.

9. A rodent trap comprising a base plate having corners, first and second pairs of corner posts, the lower ends of each of the first pair of said corner posts being rigidly mounted at opposite corners of said base plate so that each of said first pair of said corner posts extends upwardly from said base plate, said base plate having grooves in the opposite corners thereof from the lower ends of said first pair of posts, the lower end of one of said second pair of posts extending into a first one of said grooves, the lower end of the other of said second pair of corner posts extending into the other of said grooves, springs mounted in each of said grooves normally urging the lower end of each of said second pair of corner posts in an outwardly direction, U-shaped metal yokes mounted on said base plate so that the arms of said U-shaped metal yokes enclose said lower ends of said second pair of corner posts thereby preventing upward motion of said second pair of corner posts away from said base plate, a cover plate having an aperture therein, means for closing said aperture, means for fixedly attaching said cover plate to the upper ends of said first pair of corner posts, hinged means for rotatably attaching said cover plate to the upper ends of said second pair of corner posts, said base plate having a threaded recess therein coaxial with said aperture in said cover plate, a threaded receptacle detachably threaded into said threaded recess, rodent destroying material mounted within said threaded receptacle, a removable cover mounted within said threaded receptacle so that after said threaded receptacle is mounted in said threaded aperture said removable cover may be removed through said cover plate aperture, and spaced wires connecting said corner posts providing variable entrance openings for rodents therebetween but in cooperation with said base plate and said cover plate preventing large animals from reaching said rodent destroying material while enabling rodents to enter and exit said trap.

References Cited in the file of this patent

UNITED STATES PATENTS

| | | |
|---|---|---|
| 516,937 | Leflet | Mar. 20, 1894 |
| 938,397 | Pettit | Oct. 26, 1909 |
| 1,357,530 | Smith | Nov. 2, 1920 |